July 1, 1958     J. P. BAGBY ET AL     2,841,064
EXPOSURE CONTROL FOR PHOTOGRAPHIC CAMERAS
Filed Aug. 13, 1957     5 Sheets-Sheet 1
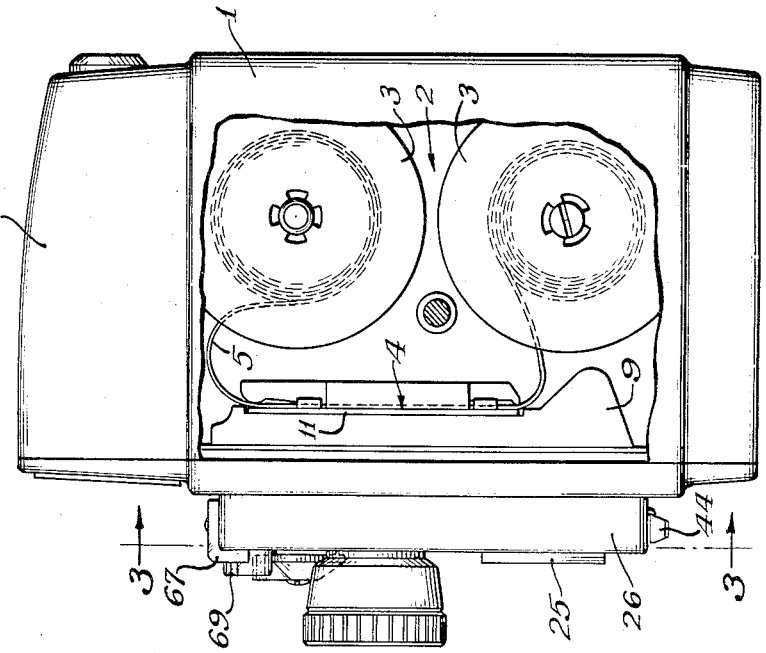
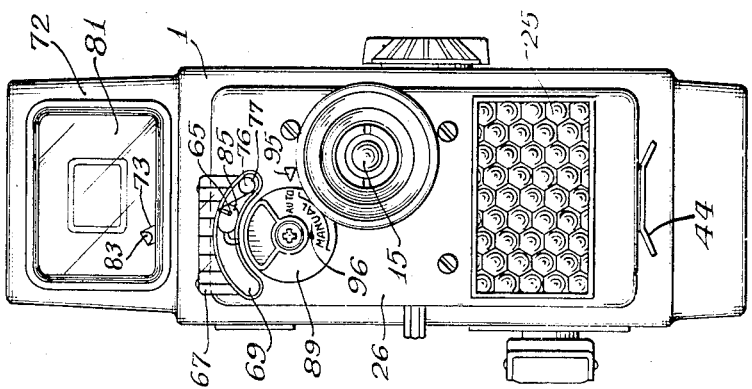
Inventors:
John P. Bagby
Stanley R. Freeland
Mervin W. LaRue, Jr.
By Robert F. Miehle    Atty.

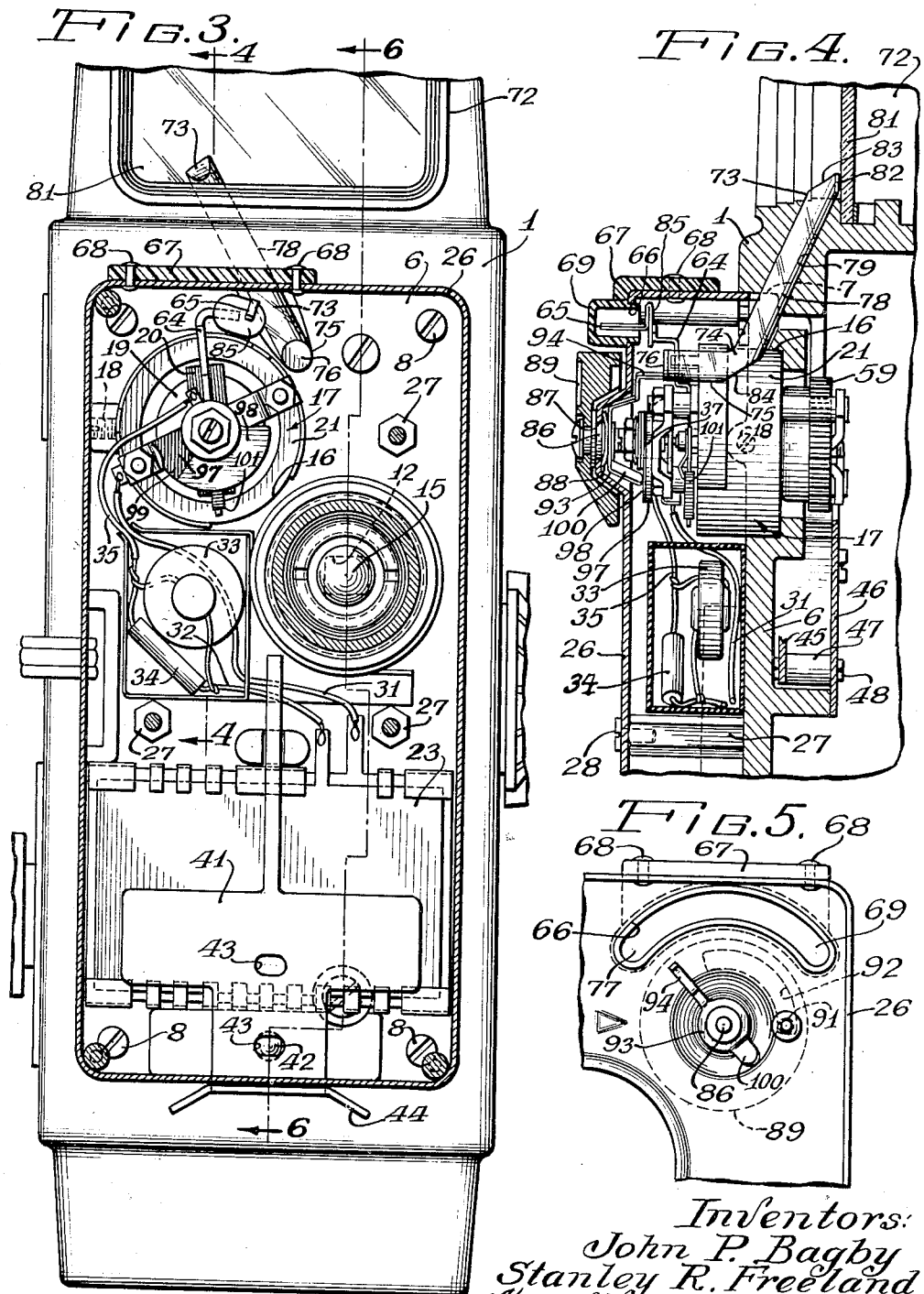

July 1, 1958 J. P. BAGBY ET AL 2,841,064
EXPOSURE CONTROL FOR PHOTOGRAPHIC CAMERAS
Filed Aug. 13, 1957 5 Sheets-Sheet 3

Inventors:
John P. Bagby
Stanley R. Freeland
Mervin W. LaRue, Jr.
By Robert F. Miehle, Atty.

July 1, 1958 J. P. BAGBY ET AL 2,841,064
EXPOSURE CONTROL FOR PHOTOGRAPHIC CAMERAS
Filed Aug. 13, 1957 5 Sheets-Sheet 4
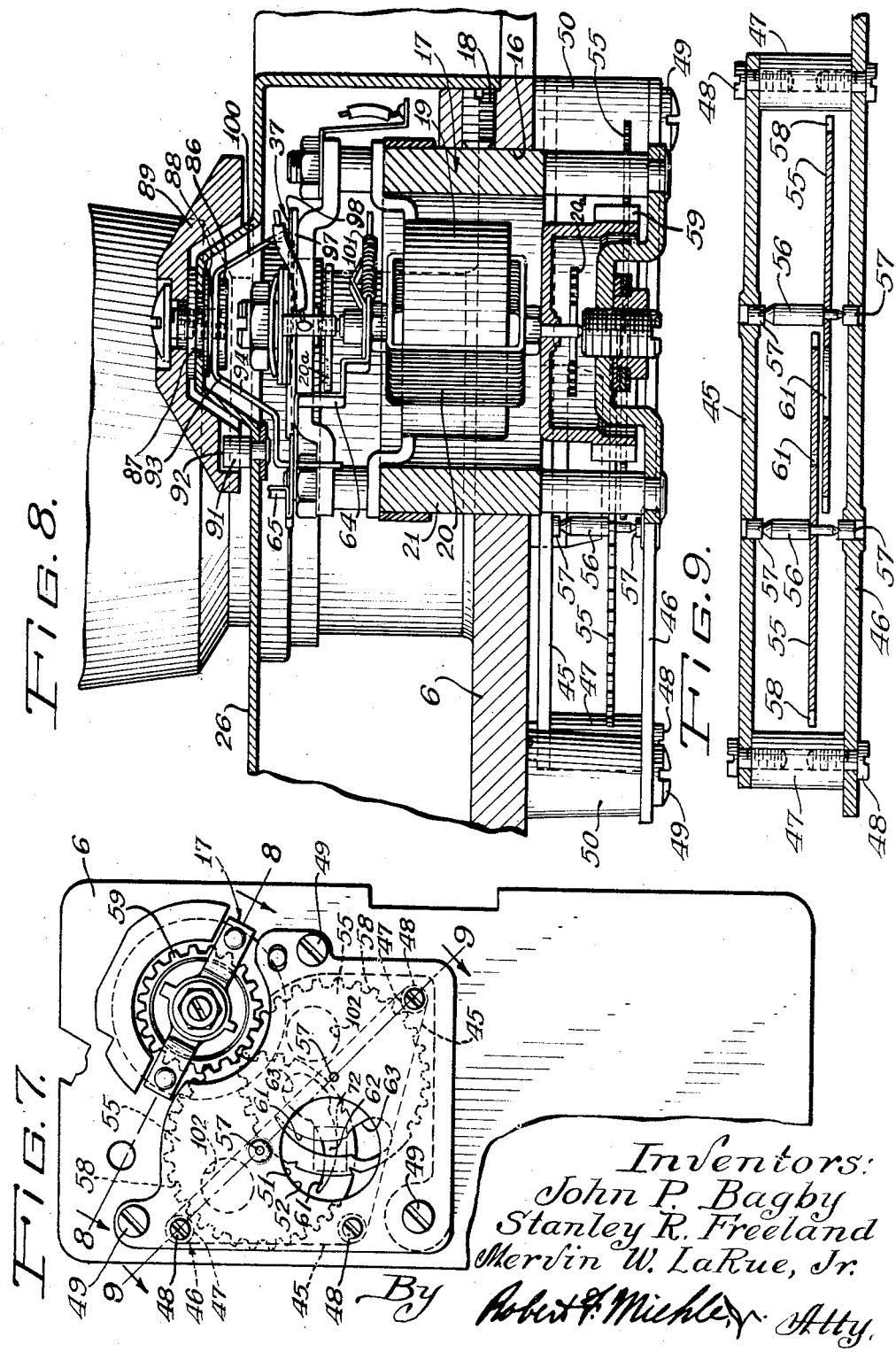
Inventors:
John P. Bagby
Stanley R. Freeland
Mervin W. LaRue, Jr.
By Robert F. Michler Atty.

July 1, 1958 J. P. BAGBY ET AL 2,841,064
EXPOSURE CONTROL FOR PHOTOGRAPHIC CAMERAS
Filed Aug. 13, 1957 5 Sheets-Sheet 5
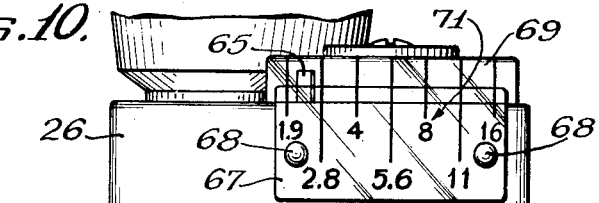
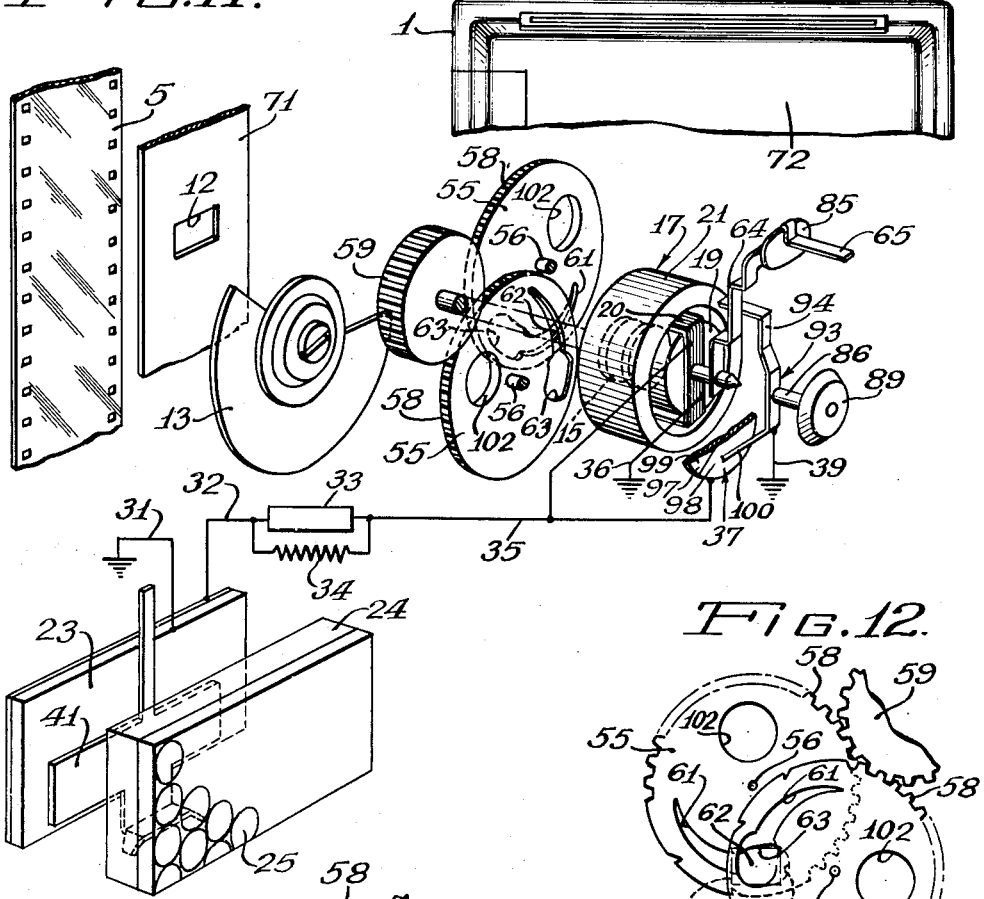
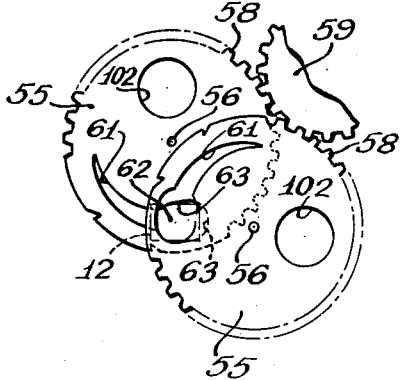
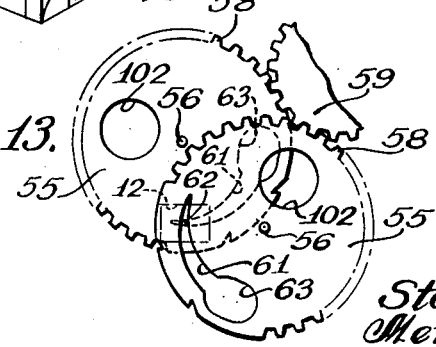
Inventors:
John P. Bagby
Stanley R. Freeland
Mervin W. LaRue, Jr.
By Robert F. Muehle, Atty.

United States Patent Office 2,841,064
Patented July 1, 1958

2,841,064

EXPOSURE CONTROL FOR PHOTOGRAPHIC CAMERAS

John P. Bagby, Skokie, Stanley R. Freeland, Evanston, and Mervin W. La Rue, Jr., Park Ridge, Ill., assignors to Bell & Howell Company, Chicago, Ill., a corporation of Illinois Application August 13, 1957, Serial No. 677,865

12 Claims. (Cl. 95—64)

This invention relates to apparatus for adjusting the exposure of a photographic camera to provide proper exposure of the film therein under different light conditions, and has for its general object the provision of a new and improved apparatus of this character.

The principal object of the invention is to provide an apparatus for automatically adjusting the exposure aperture of a camera which is quickly responsive to exposure light change, accurate, simple and reliable and which does not employ a battery energized electric motor.

Another object of the invention is to provide an apparatus for automatically adjusting the exposure aperture of a camera, which is compactly arranged and which together with the photographic lens of the camera is constructed as a unit which is detachably secured on the camera for convenience of manufacture and servicing.

Another object of the invention is to provide an apparatus for automatically adjusting the exposure aperture of a camera, which is not appreciably subject to oscillation or sensitive to movement of the camera.

Another object of the invention is to provide, in conjunction with an automatic exposure control of the type involved in the invention, simple and convenient means for manually adjusting the exposure diaphragm at will.

Another object of the invention is to provide, in conjunction with an automatic exposure control of the type involved in the invention, simple and effective means whereby the user may observe, in the view finder of the camera, when the existing light conditions are at or below the minimum required for proper exposure of the film in the camera.

Another object of the invention is to provide a simple and effective adjustable exposure diaphragm which requires very little power to adjust the same and which is particularly adapted to be adjusted directly by a galvanometer which is energized by current derived from a photoelectric cell in proportion to light impinging on the cell, and which preferably is arranged between the exposure aperture of the camera and the photographic lens thereof.

Another object of the invention is to provide an adjustable exposure diaphragm of the above type which, when used in conjunction with a rectangular exposure aperture of a camera, does not vignette the corners of the exposure aperture at small diaphragm openings.

Further objects of the invention not specifically mentioned will be apparent from the detailed description and claims which follow, reference being had to the accompanying drawings in which the preferred embodiment of the invention is shown by way of example only and in which:

Figure 1 is a front elevational view of a motion picture camera embodying the invention;

Figure 2 is a side elevational view of the camera shown in Figure 1 with a part of a side wall thereof broken away;

Figure 3 is an enlarged view similar to Figure 1 with a portion in section taken on the line 3—3 of Figure 2;

Figure 4 is a partial sectional view taken on the line 4—4 of Figure 3;

Figure 5 is a partial interior view showing a portion of the structure shown in Figure 4 and looking toward the left in Figure 4;

Figure 7 is a partial rear elevational view of the exposure control unit of the invention;

Figure 8 is an enlarged partial sectional view taken on the line 8—8 of Figure 7;

Figure 9 is an enlarged partial sectional view taken on the line 9—9 of Figure 7;

Figure 10 is a partial top plan view of the forward portion of the camera;

Figure 11 is an exploded view of the exposure control of the invention together with parts of the camera related thereto and including the circuit diagram of the control; and Figures 12 and 13 are partial rear elevational views of the diaphragm mechanism of the invention and showing it in different positions of its adjustment.

Figure 6:
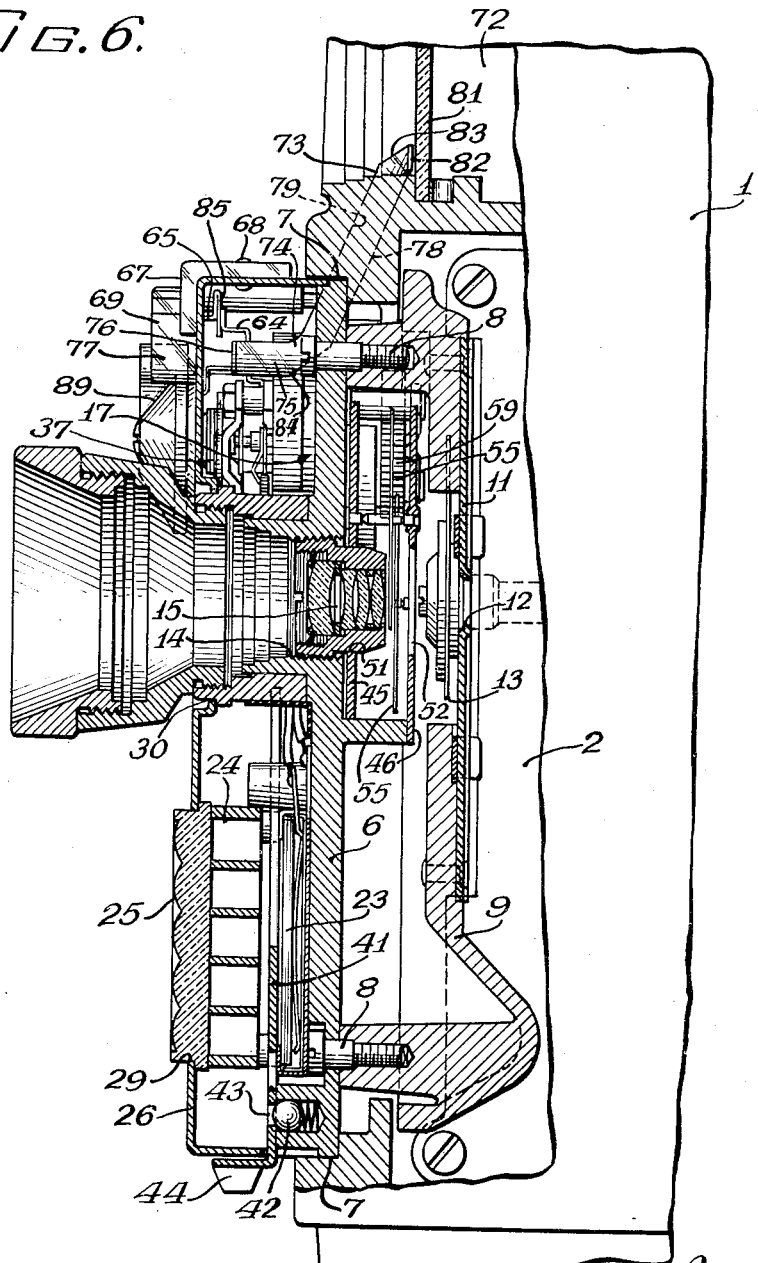
Figure 6 is a partial sectional view taken on the line 6—6 of Figure 3.

Referring to the drawings, particularly Figures 1 and 2, a motion picture camera, which per se is of standard design, comprises a casing 1 within which the mechanism of the camera is enclosed and which provides a film chamber 2 within which are arranged two vertically spaced rotatable film spools 3 and a vertical exposure guide 4 arranged at the front portion of the film chamber. A motion picture film 5 is fed from a roll thereof on the upper spool 3 to the exposure guide 4, and downwardly through the exposure guide, and taken up from the lower end of the exposure guide onto the lower film spool 3, the film being intermittently fed through the exposure guide.

The front wall 6 of the camera casing, see particularly Figure 6, comprises a separate part detachably secured in a shouldered opening 7 in the front of the main casing portion 1 by headed screws 8 screwthreaded rearwardly into a frame part 9 fixed within the main casing portion.

The exposure guide 4 comprises a front guide plate 11 which is secured within the casing on the frame part 9 in rearwardly spaced relation with the front wall 6. The film 5 is guided against the rear face of the guide plate 11, and the guide plate is provided with a forwardly facing horizontally elongated rectangular exposure aperture 12, conforming with a standard motion picture frame, through which successive frames of the film are exposed as the film is intermittently fed through the exposure guide, a rotary shutter 13 immediately in front of the guide plate being rotated in timed relation with the intermittent feed of the film to cover the exposure aperture during the film feed intervals as is usual.

The front wall 6 is provided with a lens opening 14 with which the exposure aperture 12 is alined, and a suitable photographic lens 15 is mounted on the front wall within the lens opening and in alinement with the lens opening and exposure aperture for forming images on the film at the exposure aperture.

The front wall 6 is provided with a bore 16 therethrough parallel to the lens opening 14 and disposed upwardly and to one side thereof, see Figures 3 and 8, and a galvanometer 17 is secured in this bore in axial alinement therewith by a set screw 18. The galvanometer is of usual construction and, see Figures 8 and 11, comprises a central circular permanent magnet 19, a pivoted rectangular circuit coil 20 surrounding the magnet and spring biased to a zero position by springs 20a as best shown in Figure 8, and a ring 21 of magnetic material surrounding the coil and serving to concentrate the magnetic field of the magnet, it being noted that the pivotal axis of the coil is normal to the plane of the exposure aperture 12.

A forwardly facing photoelectric cell 23 is mounted on the front face of the front wall 6 below the lens 15, see Figures 3 and 6, together with a usual light controlling baffle 24 in front of the cell and a usual recticular lens 25 in front of the baffle, the cell, baffle and reticular lens being secured in assembly on the front wall by a flanged cover 26 secured on the front wall in front of the same by means of forwardly projecting studs 27 on the front wall and headed screws 28 screwthreadedly extending rearwardly through the cover and screwthreaded into the studs.

The cover 26 has an opening 29 surrounding the lens 25 and through which light passes rearwardly through this lens and the baffle 24 to the photoelectric cell, and has another opening 30 concentric with the lens 14 through which light passes rearwardly to the photographic lens 15, and the cover forms an enclosure in front of the front wall 6 and encloses the front portion of the galvanometer and other portions of the apparatus herinafter described.

The circuit coil of the galvanometer is connected in circuit with the photoelectric cell 23, see Figure 11, so that the coil is deflected from its spring biased zero position by current derived from the photoelectric cell in proportion to the intensity of light impinging on the photoelectric cell, the photoelectric cell and galvanometer circuit comprising one terminal of the photoelectric cell connected, as designated at 31, to the metal frame work of the mechanism, which frame work is for convenience referred to as "ground," the other terminal of the cell connected by a conductor 32 to one terminal of a resistor 33 and of a resistor 34 which is connected in shunt with the resistor 34, the other terminals of these resistors connected by a conductor 35 to one terminal of the circuit coil 20 of the galvanometer, and the other terminal of this coil connected to ground as designated at 36.

The purpose of the resistors 33 and 34 is to compensate for the positive temperature coefficient of resistance of the photoelectric cell and galvanometer circuit per se, so that the deflection of the circuit coil 20 is approximately uniform throughout the range of temperature normally encountered in use, say from zero to 100° F., and for this purpose the resistor 33, commercially known as a thermistor, has a negative temperature coefficient of resistance greater than the positive temperature coefficient of resistance of the photoelectric cell and galvanometer circuit per se, and the resistor 34, serving as a modifying resistor, has a temperature coefficient of resistance lying between the positive temperature coefficient of resistance of the photoelectric cell and galvanometer circuit per se and the negative temperature coefficient of resistance of the thermistor 33, the characteristics of these resistances being selected to obtain the aforesaid compensation, as fully described and claimed in copending application for U. S. patent of Mervin W. La Rue, Jr. and William W. Wightman, Serial No. 628,753, filed December 17, 1956, for Exposure Control for Photographic Cameras, and assigned to the assignee hereof.

The photoelectric cell and galvanometer circuit further comprises a switch, generally designated at 37 and hereinafter more fully described, one terminal of which is also connected to the conductor 35 and the other terminal of which is connected to ground, as designated at 39. This switch is normally open so that the circuit coil 20 of the galvanometer is energized by current derived from the photoelectric cell 23, but which when closed short circuits the photoelectric cell so that the circuit coil of the galvanometer is deenergized for a purpose hereinafter explained.

Referring to the Figures 3 and 6, a shutter 41 is suitably mounted for vertical sliding movement within the cover 26 in front of the photoelectric cell 23 and between it and the light baffle 24. This shutter in its upper position, as shown in Figures 3 and 6, covers a portion of the photoelectric cell, and in its lower position uncovers this portion of the cell, for adjusting the deflection of the circuit coil 20 for variance of an exposure factor other than the intensity of the existing light, such as the emulsion speed of the film in the camera. The shutter 41 is releasably held in either of its positions by a spring urged ball detent 42 mounted on the front wall 6 and engageable in either of vertically spaced apertures 43 through the shutter, and the shutter is manually positionable by means of a grasp portion 44 below the cover 26.

A frame, see Figures 7, 8 and 9, comprising front and rear plates 45 and 46 secured together in parallel relation by spacing studs 47 between the plates and headed screws 48 passing through the plates and screwthreaded into the ends of the studs, is arranged immediately to the rear of the upper portion of the front wall 6, and is secured thereto in parallel relation therewith by headed screws 49 passing through extended portions of the rear plate 46 and screwthreaded into rearward extensions 50 of the front wall 6, these frame plates being thus arranged parallel to the plane of the exposure aperture 12, and the front plate 45, see Figure 6, being provided with an aperture 51 rearwardly through which the photographic lens 15 projects, and the rear plate 46 being provided with an aperture 52 alined with the exposure aperture and through which light passes from the lens 15 to the exposure aperture.

A pair of diaphragm disks 55 form an adjustable diaphragm for the photographic lens 15, and are arranged between and are mounted on the frame plates 45 and 46 for concentric rotation by means of spindles 56 extending through the disks in coaxial relation and secured therewith and having the ends thereof conical and rotatably engaged in opposing conical socket bearings 57 secured in alined apertures in the plates 45 and 46 to provide low friction bearings for the diaphragm disks.

As so mounted, the diaphragm disks 55 are arranged within the camera casing 1 and rearwardly of the front wall 6 between the exposure aperture 12 and the photographic lens 15, and are mounted for concentric rotation on spaced axes normal to the plane of the exposure aperture and spaced respectively outwardly and medially of adjoining sides of the exposure aperture, and have portions thereof overlapping in front of the exposure aperture, the diaphragm disks being slightly displaced axially from each other, as best shown in Figure 9, to provide for the overlapping relation thereof.

Noting that the pivotal axis of the circuit coil 20 of the galvanometer is parallel to those of the diaphragm disks 55 and referring particularly to Figure 7, the diaphragm disks are provided with peripheral spur gears 58, and a spur gear 59 is concentrically fixed with the circuit coil 20 and meshes with the gears 58, so that the circuit coil end diaphragm disks rotate in timed relation.

The diaphragm disks 55 are provided with arcuate openings 61 therethrough tapering in width and extending angularly of the disks and arranged to intersect centrally of the exposure aperture 12 with portions of substantially corresponding width, see Figures 7, 11, 12 and 13, to form a diaphragm opening 62 variable with angular adjustment of the disks in said timed relation as will be observed in these figures, the wide ends of the arcuate openings being preferably abnormally wide with respect to the otherwise uniform taper of these openings, as designated at 63, to insure the photographic lens 15 operating at the maximum aperture thereof when the wide ends of the arcuate openings intersect as shown in Figure 12.

Noting that the pivotal movement of the circuit coil 20 of the galvanometer effects movement of the diaphragm disks in timed relation and consequent variance of the diaphragm opening 62, light impinging on the photoelectric cell 23 energizes the circuit coil in correspondence with the intensity of the light and correspondingly deflects the circuit coil from its zero position in which the diaphragm disks are positioned to provide the largest diaphragm opening, and this deflection correspondingly adjusts the diaphragm disks to provide a diaphragm opening corresponding with the intensity of the light impinging on the photoelectric cell.

Noting that the spaced rotational axes of the diaphragm disks 55 are spaced respectively outwardly and medially of adjoining sides of the rectangular exposure aperture 12, the arcuate openings 61 of the disks form at small diaphragm openings a substantially rectangular aperture oriented in correspondence with the exposure aperture, as shown in Figures 7 and 13 in which the exposure aperture 12 is indicated. This arrangement serves to prevent vignetting at the corners of the exposure aperture, and where as shown the rectangular exposure aperture is elongated, rather than widen one of the arcuate openings, the diaphragm disks are relatively slightly differently timed as shown to form at small diaphragm openings an elongated substantially rectangular aperture oriented in correspondence with the elongated rectangular exposure aperture also for the purpose of preventing vignetting at the corners of the elongated rectangular exposure aperture.

Preferably as shown, the diaphragm disks are identical in all respects, the gears 58 being of equal radii and the arcuate openings 61 being identical, in which case the rotational axes of the diaphragm members are equidistant from the center of the exposure aperture 12.

An arm 64 is secured with the circuit coil 20 of the galvanometer for pivotal movement with the circuit coil and is disposed forwardly of the circuit coil and extends radially of and upwardly from the pivotal axis of the coil within the closure of the cover 26, see Figures 3, 4 and 11, and is provided at its upper end with a forwardly projecting pointer 65 which projects forwardly through an arcuate opening 66 through the upper portion of the front of the cover 26 to be visible from the exterior of the cover so that the position of the circuit coil 20 and consequently the adjustment of the diaphragm disks 55 may be observed.

A closure 67 of transparent material, see particularly Figures 4, 5 and 10, is secured as designated at 68, on the top flange portion of the cover 26, and has a downwardly depending portion 69 overlying the arcuate opening 66 of the cover and having an arcuate form corresponding with the opening 66 of the cover and a rearwardly directed channel cross section forwardly within which the pointer 65 projects for observance through the transparent closure portion 69. The closure 67 is provided with an index scale 71 indicating standard diaphragm stops and with which the pointer 65 cooperates to indicate the adjustment of the diaphragm disks 55, so that the automatic operation of the exposure control may be observed and the diaphragm disks may be predeterminately adjusted when the diaphragm disks are manually adjusted as hereinafter described.

A usual forwardly directed view finder 72 is arranged on the top of the camera casing 1 as best shown in Figures 1 and 2, and, see Figures 3, 4 and 6, a transparent light transmitting member 73, of "Lucite" or similar material, is angled, as designated at 74, and has the portion 75 thereof at one side of this angle directed horizontally and forwardly from the angle within the closure of the cover 26 and has the corresponding forward end surface 76 thereof facing forwardly and exteriorly of the camera and arranged rearwardly of an aligned with the end portion 77 of the channel portion 69 of the transparent closure member 67, which corresponds with the position of the arm 64 of the circuit coil 20 of the galvanometer when the diaphragm disks 55 are in their largest aperture adjustment. Consequently, light from the exterior of the camera passes rearwardly through the end portion 77 and rearwardly into the light transmitting member 73.

The portion 78 of the light transmitting member 73 at the other side of the angle 74 is directed upwardly and rearwardly from the angle and passes through and is secured in a bore 79 through the casing 1 and has its upper end portion disposed immediately in front of the front glass 81 of the view finder 72 at the lower margin thereof. The upper end of the portion 78 is angled to provide an end surface 82 facing rearwardly into the view finder and an internal reflecting surface 83 in front of this end surface and directed toward the same and downwardly toward the angle 74 of the light transmitting member. The outer portion of the angle 74 is flattened, as designated at 84, to form an internal reflecting surface directed toward the end surface 76 and the reflecting surface 83, the reflecting surface 83 being directed toward the reflecting surface 84.

Consequently, light from the exterior of the camera is normally transmitted by the light transmitting member 73 rearwardly in the view finder and is observable by the user as he observes a scene through the view finder, and the rear end surface 82 is preferably tinted, say with an amber color, to provide contrast with a scene being viewed.

The upper end of the arm 64 of the circuit coil 20 of the galvanometer is provided with a shutter 85 which, when the diaphragm disks 55 are positioned to provide the largest diaphragm opening, as shown in Figure 12, overlies the front end surface 76 of the light transmitting member and cuts off the light thereto, so that no indicating light is visible in the view finder, and which, when the diaphragm disks are positioned to provide diaphragm openings less than the largest opening, as shown in Figures 7, 11 and 13, is disposed to one side of the front end surface 76, as shown in Figure 3, so that an indicating light is visible in the view finder.

Thus, the user may conveniently observe in the view finder when the existing light conditions are at or below the minimum required for proper exposure of the film in the camera, and it is to be noted that the placement of the galvanometer at the front of the camera in downwardly adjacently spaced relation with the view finder and with the galvanometer circuit coil 20 disposed on a forwardly and rearwardly extending pivotal axis, promotes compactness and simplicity of the indicating means.

A stud 86, see Figures 4 and 8, is rotatably mounted in an aperture 87 through the cover 26 in coaxial relation with the galvanometer circuit coil 20, and is yieldably maintained in angularly adjusted position by a friction washer 88. A knob 89 is secured on the stud 86 in front of the cover 26, so that the stud is manually adjustable about its axis, and a stud 91, secured on the cover, extends into an arcuate recess 92 in the rear face of the knob, see Figures 5 and 8, and is engageable with the ends of this recess to limit pivotal movement of the knob 89 and stud 86.

An arm member 93 is intermediately secured on the stud 86 within the cover 26, and one arm 94 of the arm member extends radially and rearwardly of this stud to lie in the path of the arm 64 which is fixed for movement with the galvanometer circuit coil 20, the arms 64 and 94 constituting cooperating abutment members and the arm 94 being engageable with the arm 64, see Figure 11, to adjust the diaphragm disks 55 to decrease the diaphragm aperture and having a non functioning position permitting adjustment of the diaphragm disks throughout the range of adjustment of the disks.

Thus, when the arm 94 is in its non functioning position, the diaphragm disks are free to be adjusted automatically as above described, and the arm 94 may be manually adjusted out of its non functioning position by means of the knob 89 to adjust the diaphragm disks to positions providing smaller diaphragm openings that the diaphragm opening which would otherwise be provided by the automatic exposure control, say to meet unusual exposure conditions which the automatic exposure control cannot meet.

The front face of the cover 26 is provided with an index mark 95, see Figure 1, adjacent the periphery of the knob 89, and the front face of the knob is provided with legends 96, namely "Auto" and "Manual," to indicate in cooperation with the index mark whether the mechanism is set for automatic or manual control.

Preferably, the galvanometer 17 is deenergized when the mechanism is set for manual control, so that the diaphragm disks 55 may be manually adjusted throughout their range of adjustment rather than only to diaphragm openings smaller than that instantly provided by the automatic exposure control, and this is the function of the switch 37 hereinbefore referred to and which will now be described.

A plate 97 of insulating material is secured on the galvanometer 17 at the front end thereof and within the closure of the cover 26, see Figures 3, 4, 8 and 12, and is disposed normal to and extends arcuately about the axis of the stud 86. An arcuate metal contact plate 98, which is insulated from the frame work of the mechanism, is inset into and secured on the front face of the plate 97 and extends arcuately thereof, but is not arcuately coextensive therewith, so that an end portion 99 of the insulating plate extends beyond the contact plate and presents a forwardly facing insulating surface continuing the forwardly facing surface of the contact plate.

Another arm 100 of the arm member 93, see Figures 4, 5, 8 and 11, extends radially and rearwardly of the stud 86, and resiliently bears rearwardly against the insulating surface portion 99 of the plate 97 or the contact plate 98 depending upon the angular position of the stud 86 with which the arm member 93 is secured, the insulating plate 97, the contact plate 98 and the arm 100 constituting the switch 37, the arm 100 being grounded, as designated at 39, and the contact plate being connected with the conductor 35 as shown in Figure 12.

The arrangement of the switch 37 is such that when the knob 89 is positioned for automatic exposure control, the arm 100 is in contact with the end portion 99 of the insulating plate 97, so that the switch is open and the galvanometer 17 is energized by the photoelectric cell 23 for automatic exposure control, and when the knob 89 is positioned for manual exposure control the arm 100 is in contact with the contact plate 98 throughout the manual adjustment range of the knob, as shown in Figure 12, so that the switch 37 is closed and the galvanometer is short circuited during manual exposure control.

The circuit coil 20 and the parts fixed for rotation therewith and the diaphragm disks 55 are preferably rotationally balanced, the circuit coil being provided with a counterbalance 101 arranged in diametrically opposite relation with the arm 64, see Figures 3 and 8, and the diaphragm disks, see Figures 7, 12 and 13, being provided with counterbalancing apertures 102 arranged in diametrically opposite counterbalancing relation with the arcuate diaphragm opening forming openings 61 of the diaphragm disks.

Noting that the meshing gears 58 and 59 of the diaphragm disks and galvanometer circuit coil 20 provide rotation of the circuit coil and gear 59 fixed therewith opposite that of the diaphragm disks, these oppositely rotating elements are provided with relative rotational inertia such as to oppose rotation thereof relative to and responsive to rotational movement of the camera, so that such movement of the camera does not affect the diaphragm opening adjustment.

It has been observed in operation that, while the automatic exposure control is sensitive and quickly responsive to exposure light change, the galvanometer circuit coil 20 and diaphragm disks 55 are not subject to appreciable oscillation when the potential on the circuit coil changes suddenly, and it is thought that this is due to the damping effect of the slight friction of the mesh of the gears 58 and 59 and the bearings of the circuit coil 20 and the diaphragm disks 55.

Since changes can be made in the foregoing construction and different embodiments of the invention can be made without departing from the spirit and scope thereof, it is intended that all matter shown in the accompanying drawings and described hereinabove shall be interpreted as illustrative and not in a limiting sense.

What is claimed as new is:

1. In a photographic camera, the combination of an adjustable diaphragm for varying the exposure of the camera, a photoelectric cell, a galvanometer having a pivoted spring biased circuit coil connected in circuit with said cell, a coupling between said coil and diaphragm whereby the latter is directly adjusted by movement of said coil to decrease and increase the diaphragm aperture respectively with increase and decrease of light impinging on said cell, a first abutment member connected to move with said coil and diaphragm and a second manually adjustably arcuately movable abutment member engageable with said first abutment member to rotate the first abutment member to adjust said diaphragm to reduce the diaphragm aperture and having a position arcuately outside the path of movement of said first abutment member in which adjustment of said diaphragm by said coil is unaffected by said second abutment member throughout the range of adjustment of said diaphragm by said coil, and means operable during manual operation of the diaphragm and including means acting against a member moving with said coil to urge said diaphragm in the direction of increased opening of the diaphragm aperture.

2. In a photographic camera, the combination of an adjustable diaphragm for varying the exposure of the camera, a photoelectric cell, a galvanometer having a pivoted spring biased circuit coil connected in circuit with said cell, a coupling between said coil and diaphragm whereby the latter is directly adjusted by movement of said coil to decrease and increase the diaphragm aperture respectively with increase and decrease of light impinging on said cell, a first abutment member connected to move with said coil and diaphragm, a second manually adjustably arcuately movable abutment member engageable with said first abutment member to rotate the first abutment member to adjust said diaphragm to reduce the diaphragm aperture and having a position arcuately outside the path of movement of said first abutment member in which adjustment of said diaphragm by said coil is unaffected by said second abutment member throughout the range of adjustment of said diaphragm by said coil, and means de-energizing said galvanometer coil upon movement of said manually adjustable abutment member whereby said galvanometer is moved toward the aperture opening position by said spring.

3. In a photographic camera, the combination of an adjustable diaphragm for varying the exposure of the camera, a photoelectric cell, a galvanometer having a pivoted spring biased circuit coil connected in circuit with said coil, a coupling between said coil and diaphragm whereby the latter is adjusted by movement of said coil to decrease and increase the diaphragm aperture respectively with increase and decrease of light impinging on said cell, an abutment member connected to move with said coil and diaphragm, and a manually adjustable abutment member engageable with said first mentioned abutment member to adjust said diaphragm to decrease the diaphragm aperture and having a non-functioning position permitting adjustment of said diaphragm by said coil throughout the range of adjustment of said diaphragm, and a switch connected with the photoelectric cell and coil circuit for de-energizing said coil, said switch being under the control of said manually adjustable abutment member for energizing and de-energizing said coil respectively when said manually adjustable abutment member is in and out of said non-functioning position.

4. In a photographic camera, the combination with a viewfinder, an adjustable diaphragm for varying the exposure of the camera, a photoelectric cell, a galvanometer having a pivoted spring biased circuit coil connected in circuit with said cell, means directly coupling said coil to said diaphragm whereby the diaphragm is adjusted by movement of said coil to decrease and increase the diaphragm aperture respectively with increase and decrease in light impinging on said cell, and means for indicating in said viewfinder when said diaphragm is in and out of its largest aperture adjustment, said last named means comprising means for transmitting light from the exterior of the camera rearwardly in said viewfinder and a light control member connected to said coil for movement into and out of the path of said light transmitting means in response to movement of said diaphragm to effect transmission and non-transmission of said light in different positions of said diaphragm.

5. In a photographic camera, the combination with a viewfinder, an adjustable diaphragm for varying the exposure of the camera, a photoelectric cell, a galvanometer having a pivoted spring biased circuit coil connected in circuit with said cell, means directly coupling said coil to said diaphragm whereby the diaphragm is adjusted by movement of said coil to decrease and increase the diaphragm aperture respectively with increase and decrease in light impinging on said cell, and means for indicating in said viewfinder when said diaphragm is in and out of its largest aperture adjustment, said last named means comprising means for transmitting light from the exterior of the camera rearwardly in said viewfinder and a light control member connected to said coil for movement into and out of the path of said light transmitting means in response to movement of said diaphragm to effect transmission and non-transmission of said light in different positions of said diaphragm and comprising further an elongated angularly bent light transmitting member having one end surface thereof facing exteriorly of the camera and having the other end surface thereof facing rearwardly in said viewfinder for transmitting light rearwardly therein.

6. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, at least one additional rotative member directly connected to said first rotative member, at least two of said members being connected for rotation in opposite directions, at least two of said rotative members having diaphragm members with arcuate openings moving in overlapping relationship with the axes of the openings intersecting in front of said exposure aperture, said rotative members being individually balanced about their respective axes and said rotative members forming a rotative system in which the rotational inertia of the members connected for rotation in one direction acts against and approximately balances the rotational inertia of the members connected thereto for rotation in the opposite direction rendering said diaphragm insensitive to external accelerations without rendering the diaphragm members insensitive to movement by torque applied by said motor means or spring means.

7. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, at least one additional rotative member directly connected to said first rotative member, said members being mounted for movement about axes spaced from each other, at least two of said members being connected for rotation in opposite directions, and at least two of said rotative members having diaphragm members with arcuate openings moving in overlapping relationship with the axes of the openings intersecting in front of said exposure aperture, said rotative members being individually balanced about their respective axes and said rotative members forming a rotative system in which the rotational inertia of the members connected for rotation in one direction acts against and approximately balances the rotational inertia of the members connected thereto for rotation in the opposite direction rendering siad diaphragm insensitive to external accelerations without rendering the diaphragm members insensitive to movement by torque applied by said motor means or spring means.

8. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, a plurality of additional rotative members directly connected to said first rotative member, said additional rotative members being connected for rotation in the same direction and in opposition to said first member, said plurality of rotative members comprising diaphragm members with arcuate openings moving in overlapping relationship with the axes of the openings intersecting in front of said exposure aperture, said rotative members being individually balanced about their respective axes, and said rotative members forming a rotative system in which the rotational inertia of the member rotating in said one direction acts against and approximately balances the total rotational inertia of the plurality of rotative members connected in opposition thereto rendering said diaphragm insensitive to external accelerations without rendering the diaphragm members insensitive to movement by torque applied by said motor means or spring means.

9. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, at least one additional rotative member directly connected to said first rotative member, at least two of said members being connected for rotation in opposite directions, at least two of said rotative members having diaphragm members with arcuate openings moving in overlapping relationship with the axes of the openings intersecting in front of said exposure aperture, said rotative members being individually balanced about their respective axes and said rotative members forming a rotative system in which the rotational inertias of the members connected for rotation in opposite directions act against and approximately balance each other rendering said diaphragm insensitive to external accelerations without rendering the diaphragm members insensitive to movement by torque applied by said motor means or spring means.

10. In a photographic camera, the combination comprising means forming an exposure aperture, a photoelectric cell, spring means, motor means having a single rotative member driven in one direction by said photoelectric cell and the opposite direction by said spring means, the relative angular position of said rotative member being determined by the relative output of said photoelectric cell, a pair of additional rotative members directly connected to said first rotative member, said pair of members being connected for rotation in the same direction about spaced axes and in opposition to said first member, said pair of members comprising diaphragm members with arcuate openings moving in overlapping relationship with the axes of the openings thereof intersecting in front of said exposure aperture, said rotative members being individually balanced about their respective axes and said rotative members forming a rotative system in which the rotational inertia of the member rotating in said one direction acts against and approximately balances the total rotational inertia of the said pair of rotative members connected in opposition thereto, rendering said diaphragm members insensitive to external accelerations without rendering the diaphragm members insensitive to movement by torque applied by said motor means or spring means, said rotative members being mounted in substantially anti-friction bearings to minimize resistance to movement produced by variations in the output of said photoelectric cell.

11. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, at least one additional rotative member directly connected to said first rotative member, at least two of said members being connected for rotation in opposite directions, at least two of said rotative members having diaphragm members with arcuate openings moving in overlapping relationship with the axes of the openings intersecting in front of said exposure aperture, said rotative members being individually balanced about their respective axes and said rotative members forming a rotative system in which the rotational inertias of the members connected for rotation in opposite directions act against and approximately balance each other rendering said diaphragm insensitive to external accelerations without rendering the diaphragm members insensitive to movement by torque applied by said motor means or spring means, said rotative members being mounted in substantially anti-friction bearings to minimize resistance to movement produced by variations in the output of said photoelectric cell.

12. In a photographic camera, the combination comprising means forming an exposure aperture, a photoelectric cell, spring means, motor means having a single rotative member driven in one direction by said photoelectric cell and the opposite direction by said spring means, the relative angular position of said rotative member being determined by the relative output of said photoelectric cell, a pair of additional rotative members directly connected to said first rotative member, said pair of members being connected for rotation in the same direction about spaced axes and in opposition to said first member, said pair of members comprising diaphragm members with arcuate openings moving in overlapping relationship with the axes of the opening thereof intersecting in front of said exposure aperture, said rotative members being individually balanced about their respective axes and said rotative members forming a rotative system in which the rotational inertia of the member rotating in said one direction acts against and approximately balances the total rotational inertia of the said pair of rotative members connected in opposition thereto, rendering said diaphragm members insensitive to external accelerations without rendering the diaphragm members insensitive to movement by torque applied by said motor means or spring means.

References Cited in the file of this patent

UNITED STATES PATENTS

| | | |
|---|---|---|
| 1,813,635 | Myers | July 7, 1931 |
| 1,924,700 | Thilo | Aug. 29, 1933 |
| 2,058,532 | Tuttle | Oct. 27, 1936 |
| 2,059,032 | Riszdorfer | Oct. 27, 1936 |
| 2,206,086 | Galyon | July 2, 1940 |
| 2,250,898 | Tonnes | July 29, 1941 |
| 2,453,693 | Armstrong | Nov. 16, 1948 |
| 2,551,085 | Bach | May 1, 1951 |
| 2,556,546 | Lee | June 12, 1951 |
| 2,652,756 | Willcox | Sept. 22, 1953 |
| 2,655,086 | Walker | Oct. 13, 1953 |

FOREIGN PATENTS

| | | |
|---|---|---|
| 503,901 | Great Britain | Apr. 17, 1939 |
| 985,935 | France | Mar. 21, 1951 |
| 755,177 | Germany | Apr. 27, 1953 |